(12) United States Patent
Davis

(10) Patent No.: US 6,618,473 B1
(45) Date of Patent: Sep. 9, 2003

(54) TELEPHONE CALLER SCREENING DEVICE

(75) Inventor: William Folsom Davis, Tempe, AZ (US)

(73) Assignee: Dasym Technologies, Inc., Mesa, AZ (US)

( * ) Notice: Subject to any disclaimer, the term of this patent is extended or adjusted under 35 U.S.C. 154(b) by 0 days.

(21) Appl. No.: 09/899,972

(22) Filed: Jul. 6, 2001

(51) Int. Cl.[7] .................. H04M 1/56; H04M 15/06; H04M 3/00

(52) U.S. Cl. ............... 379/142.05; 379/142.01; 379/142.04; 379/142.05; 379/142.06; 379/372; 379/373.01; 379/377

(58) Field of Search ............. 379/142.01, 142.04, 379/142.05, 142.06, 142.17, 361, 362, 372, 373.01, 373.02, 373.03, 376.02, 377, 70, 82, 88.19, 88.2, 88.21, 73.02, 93.03, 93.05, 93.17, 207.16, 211.01, 179, 182, 183

(56) References Cited

U.S. PATENT DOCUMENTS

| | | | |
|---|---|---|---|
| 4,132,864 A | * 1/1979 | Feng | 379/377 |
| 5,048,076 A | 9/1991 | Maurer et al. | |
| 5,117,452 A | * 5/1992 | Callele et al. | 379/93.05 |
| 5,343,516 A | * 8/1994 | Callele et al. | 379/93.05 |
| 5,544,241 A | 8/1996 | Dibner et al. | |
| 5,577,104 A | * 11/1996 | Knuth et al. | 379/67.1 |
| 5,604,791 A | 2/1997 | Lee | |
| 5,809,111 A | 9/1998 | Matthews | |
| 5,905,786 A | * 5/1999 | Hoopes | 379/142.01 |
| 5,926,537 A | * 7/1999 | Birze | 379/252 |
| 6,160,884 A | * 12/2000 | Davis | 379/373 |
| 6,556,673 B1 | * 4/2003 | Davis | 379/377 |

OTHER PUBLICATIONS

Internet article—US WEST, "US West Launching Additional Services to Help Customers Disconnnect From Unwanted Phone Calls," www..uswest.com/com/insideusw/022299.html. Feb. 22, 1999.

Internet Press Release, Matthers Communications, "Matthews Communication Debuts Professional Call Management System for Active Households, Home Offices and Small Businesses," www.mattewsinnovations.com, Jan. 7, 1999.

Data Sheet—Mattews Communications, Data Sheet CMS2001 (related to above press release), date not available.

* cited by examiner

Primary Examiner—Curtis Kuntz
Assistant Examiner—Quoc D Tran
(74) Attorney, Agent, or Firm—Ingrassia Fisher & Lorenz, P.C.

(57) ABSTRACT

A telephone caller screening device is operable with a pre-existing telephone line with an existing installed telephone device. In one mode, the telephone caller screening device selects and stores caller ID information from incoming telephone calls for later use to compare with caller entered identification data to determine whether the premise telephone user should be alerted to the incoming telephone call. In a second mode the telephone caller screening device controls the telephone system by generating an off-hook condition on the pre-existing telephone line to suppress the ring signal from an incoming telephone call to prevent audible ringing of the telephone device. The telephone caller screening device generates an alerting signal in an alerting device when the caller entered identification data compares with a stored caller identification data. In the event that the caller does not enter valid identification data, or the call recipient did not respond to the alerting signal in a predetermined time interval, the incoming telephone call is directed to a message device.

15 Claims, 6 Drawing Sheets

TELEPHONE CALLER SCREENING DEVICE

BACKGROUND OF THE INVENTION

The present invention relates to a telephone caller screening device and, more specifically, to the selection of caller identification to be stored in a call screening memory, for use in silently screening incoming telephone calls.

Many people have experienced the annoyance of a telephone ringing during dinner time only to discover that it was an unwanted sales solicitation. Several methods have been presented to the public, attempting to solve this problem.

In the past, telephone operating companies have offered caller avoidance services to their customers. For example, US West, now Qwest, offers No Solicitation™ and Caller ID with Privacy+™. Both services are designed to work in conjunction with the Caller Identification feature known as Caller ID that is provided by the telephone operating company at an additional monthly cost to the user. No Solicitation™ allows customers to pre-select up to 25 telephone numbers of callers enabling bypass of a No Solicitation™ message automatically and allowing the telephone(s) to ring. All other callers will hear the message—"You have reached a number that does not accept solicitation. If you are a solicitor, please add this number to your do not call list and hang up now. Otherwise please press 'one' or stay on the line." Thus, if the unwanted solicitor is persistent by pressing 'one' or staying on the line, the phone(s) would still ring. Callers with selected numbers on the list, who are calling from a non-selected number, will also be intercepted with the No Solicitation™ message. Furthermore, users of the No Solicitation™ service must tediously enter all 25 desired telephone numbers into the screening system. Caller ID with Privacy+™ requires callers whose names appear as "Unavailable" on Caller ID units to identify themselves by recording their name. This allows the user to hear the name and choose whether to accept the call. The telephones will be permitted to ring once this requirement is satisfied. Therefore, all solicitors whose Caller ID is "Available", but unknown to the user, will continue to disturb the premise with ringing telephones. Known callers, who call from an unfamiliar number, may also be ignored by the user. Known callers, who call from an "Unavailable" number, also will experience this call screening process. Both, No Solicitation™ and Caller ID with Privacy+™, require additional monthly telephone service fees charged to the user by the telephone operating company, and ultimately, do not prevent the phones from ringing due to unwanted callers.

Another technique available to the public is provided by the CMS2001 device from Matthew's Communications Management, Inc., U.S. Pat. No. 5,809,111. In addition to a central control module, an additional control module is associated with each telephone unit. The control module associated with each telephone unit can isolate the telephone unit from the telephone line, preventing initial ringing of the telephone unit during an incoming telephone call. Specific control modules and associated telephone units are selectively activated by the central control module based on caller information. However, when caller information is based on Caller ID data, known callers who are "Unavailable", or who are calling from an unknown number, will be erroneously screened. The user, in addition to paying for the central control module must also pay for an additional control module for each telephone unit. Thus, this system has a considerable associated expense.

Yet, another technique, similar to that of the CMS2001 device, is provided by U.S. Pat. No. 5,425,089. In this technique, each telephone unit is associated with a control module that isolates an individual telephone device from the telephone line by a switch. However, all incoming telephone calls allow the individual isolated telephone device to ring at least once, prior to answering and receiving caller ID data for screening. The control module then determines a valid caller and causes the isolated telephone to ring distinctively based on caller information. Thus with this technique, a user is always disturbed by all incoming telephone callers.

Hence, there is need for a caller screening device that will silently screen telephone callers based on selected caller identification data, and alert a premise user of an incoming telephone caller only when the caller is known, without regard to the actual physical location, or nature, of the telephone devices being used by the caller.

To reduce cost, there is a further need to silently answer and screen telephone callers without isolating the telephone devices from the telephone line with switches, yet to prevent audible ringing of the telephone devices connected to the line during the incoming ring signal on the telephone line. This is to be accomplished without adding a costly control device to each receiving telephone device in the system.

SUMMARY OF THE INVENTION

Accordingly, it is the object of the invention to provide an improved telephone caller screening device.

It is another object of the invention to provide an improved telephone caller screening device by selecting and storing selected telephone caller identification data without requiring manual input by the telephone system user, by using the caller ID information received from previous incoming telephone calls.

It is another object of the invention to provide an improved telephone caller screening device that is operable with pre-existing installed telephone devices coupled to an existing telephone line.

It is, yet, another object of the invention to provide an improved telephone caller screening device that causes the silent answering of an incoming telephone call by generating an off-hook condition on the telephone line, in response to a telephone ring signal, such that audible ringing of the telephone devices connected to the telephone line is suppressed, and the ring signal of the incoming telephone call is terminated.

It is yet another object of the invention to provide an improved telephone caller screening device which, when coupled to a telephone line, prevents audible ringing of telephone devices when in a Privacy mode without the added expense of isolating the telephone devices from the telephone line during the incoming telephone ring signal on the line.

A further object of the invention is to provide an improved telephone caller screening device that generates an alerting signal to activate an alerting device for alerting the recipient of a telephone call in response to a valid code from the telephone caller.

It is still a further object of the present invention to provide a system in which a valid telephone caller activates an alerting device when the caller enters a valid code associated with the telephone caller.

It is still another object of the invention to provide an improved telephone caller screening device that is silently operable with a message device when the caller does not enter a valid code.

More generally, the present invention is intended to be coupled to the telephone line, and work with a pre-existing installed telephone system to silently screen incoming telephone callers.

DETAILED DESCRIPTION OF THE DRAWINGS

The present invention is a telephone caller screening device configured for controlling an incoming telephone call by operating in a Caller Data Collection mode and in a Privacy mode. In the Caller Data Collection Mode and in the Privacy mode, all the telephone devices are normally connected to the telephone line to receive and make telephone calls. In the Caller Data Collection mode, the caller identification from incoming telephone calls is collected in a caller identification data memory. The caller identification in the caller identification data memory is selectively transferred to the caller screening data memory for use in screening incoming telephone calls, when operating in the Privacy mode.

In the Privacy mode, an incoming telephone call is automatically answered by the caller screening device, and the incoming ring signal on the telephone line is suppressed prior to the first quarter-cycle of the first incoming ring signal, preventing telephones connected to the telephone line from ringing, and causing termination of the incoming ring signal. When the telephone call is answered by the caller screening device, the caller provides an identification response, which is related to the caller and the selected caller identification data. The identification response is compared to the data in the caller screening memory to determine one of several actions in response to the incoming telephone call.

Figure 1:
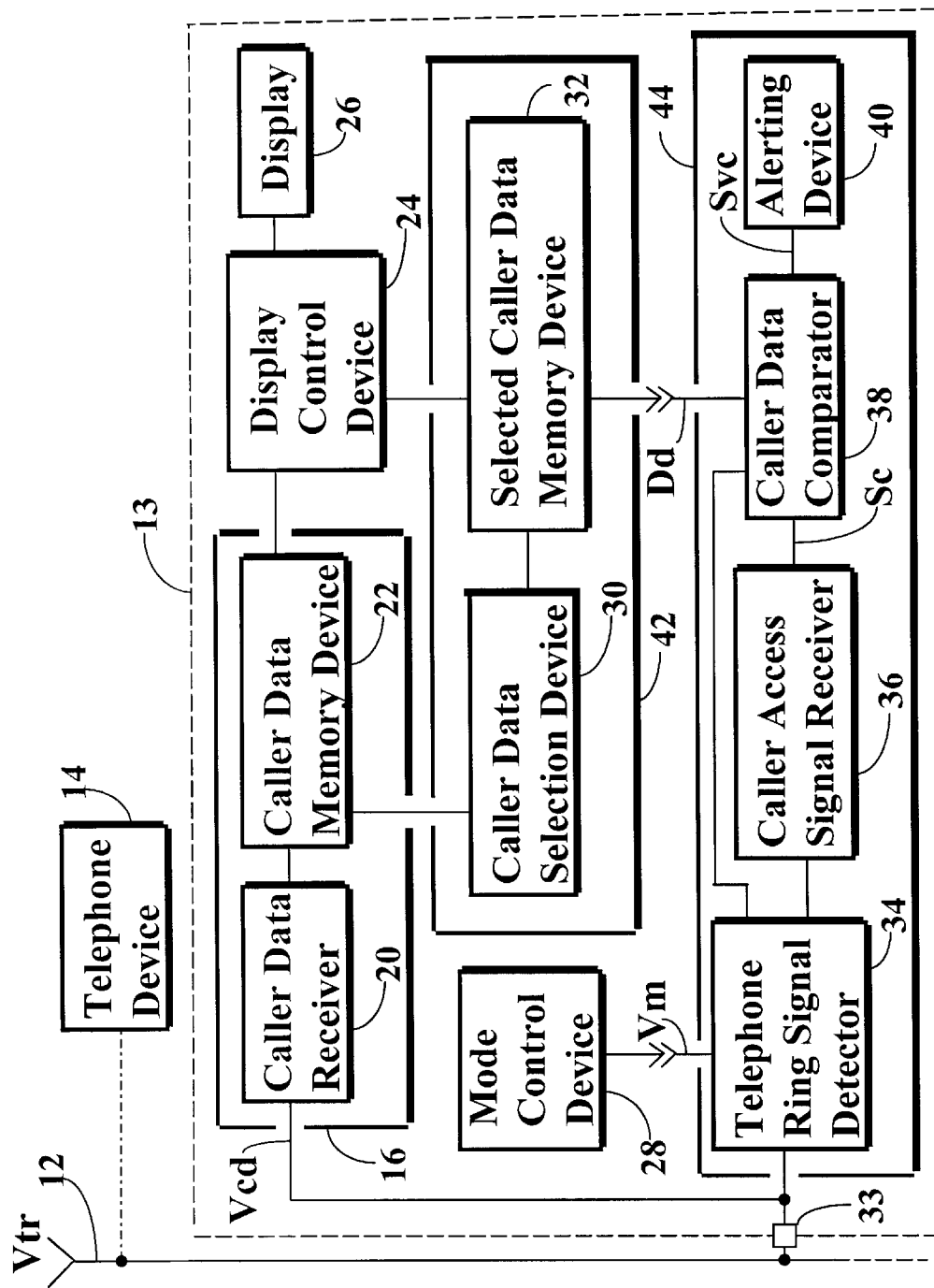
FIG. 1 illustrates a block diagram of one embodiment of a Telephone Caller Screening Device for describing the operation in the Caller Data Collection mode and in the Privacy mode.

Looking at one embodiment of the present invention, Telephone Caller Screening Device 13 of FIG. 1, telephone line 12 is connected (or connectable) to Telephone Device 14. Telephone line 12 is further connected to Caller Data Receiver 20, and to Telephone Ring Signal Detector 34 via port 33. Other telephone devices (not shown), such as Telephone Device 14, alternatively may be connected to the telephone line 12. Caller Data Memory Device 22 is connected to Caller Data Receiver 20. Caller Data Receiver 20 and Caller Data Memory Device 22 comprise Caller Identification Device 16.

Display Control Device 24 is connected to Caller Data Memory Device 22, and Display 26 is connected to Display Control Device 24. Caller Data Receiver 20, Caller Data Memory Device 22, and Display 26 are components of a typical commercially available Caller ID device. Caller Data Selection Device 30 is connected to Caller Data Memory Device 22. Selected Caller Data Memory Device 32 is connected to Caller Data Selection Device 30, and to Display Control Device 24. Display Control Device 24 enables Display 26 to display data from either Caller Data Memory Device 22, or Selected Caller Data Memory Device 32.

Caller Data Selection Device 30 and Selected Caller Data Memory Device 32 comprise Caller Data Collection mode function block 42. Caller Identification Device 16, Caller Data Collection mode function block 42, Display Control device 24, and display 26 are elements of Caller Data Processor 15.

Caller Access Signal Receiver 35 is connected to Telephone Ring Signal Detector 34. Caller Data Comparator 38 is connected to Caller Access Signal Receiver 35, to Telephone Ring Signal Detector 34, and to Selected Caller Data Memory Device 32. Alerting Device 39 is connected to Caller Data Comparator 38. Telephone Ring Signal Detector 34, Caller Access Signal Device 35, Caller Data Comparator 38, and Alerting Device 39 comprise a Caller Screening Processor 44.

Mode Control Device 28 is connected to Telephone Ring Signal Detector 34. Output mode control signal Vm of Mode Control Device 28 may be set manually, or automatically, by the Telephone Caller Screening Device user to set the capability of Caller Screening Processor 44. Signal Vm is set to a binary zero level for the Caller Data Collection mode, or to a binary one level for the Privacy mode. When output signal Vm of Mode Control Device 28 is set to a zero level, Telephone Caller Screening Device 13 is operating in the Caller Data Collection mode, and Telephone Ring Signal Detector 34 is not active.

An incoming telephone call begins with incoming telephone ring signals and caller identification signals Vcd both appearing on telephone line 12 as incoming signal Vtr. The ring signals cause Telephone Device 14 to emit audible alerting signals, and the caller identification signals cause Caller Data Receiver 20 to detect the caller identification from signal Vcd. The caller identification is transmitted from Caller Data Receiver 20 for storing in the Caller Data Memory Device 22. The stored caller ID data is then displayed on Display 26 via Display Control Device 24 from the Caller Data Memory Device 22.

While the Telephone Caller Screening Device 13 is operating in Caller Data Collection Mode, all incoming telephone calls are processed normally, using telephone device 14. In any mode, the user of Telephone Caller Screening Device 13 can conveniently scroll through the caller identification stored in Caller Data Memory Device 22, displayed on Display 26 via Display Control Device 24. Caller identification is selectively transferred by the user from Caller Data Memory Device 22 to Selected Caller Data Memory 32 via Caller Data Selection Device 30.

The user of Telephone Caller Screening Device 13 then conveniently scrolls through the selected caller data stored in Selected Caller Data Memory Device 32 displayed on Display 26 via Display Control Device 24. The selected caller data stored in Selected Caller Data Memory Device 32 is available for use in the Privacy mode of Telephone Caller Screening Device 13.

Further in the embodiment of FIG. 1, when signal Vm of the Mode Control Device 28 is set to a one level, the Telephone Caller Screening Device 13 is set in the Privacy mode, and the capability of Caller Screening Processor 44 is changed so that Telephone Ring Signal Detector 34 is activated.

In the Privacy mode, ring signals associated with an incoming telephone call on telephone line 12 will cause Telephone Ring Signal Detector 34 to generate an off-hook condition on telephone line 12 prior to the first quarter-cycle of the first incoming ring signal. An off-hook condition on telephone line 12 is equivalent to answering the telephone call by picking up the telephone handset from its cradle. This off-hook condition causes the Telephone Company Central Office to terminate the ring signals from the incoming telephone call, preventing Telephone Device 14 from emitting audible alerting signals, thereby being unresponsive to incoming ring signals. The operational characteristics of Telephone Ring Signal Detector 34 is described in Davis, U.S. Pat. No. 5,920,624.

After the Telephone Ring Signal Detector 34 causes the off-hook condition on telephone line 12, Telephone Ring Signal Detector 34 transmits a signal via telephone line 12 to the telephone caller, indicating that caller identification data be provided by the caller. As an example, the caller manually enters a code, e.g., the last four digits of the caller's home telephone number, using the caller's telephone keypad. As another example, the caller speaks the last four digits of the caller's home telephone number. Caller Access Signal Receiver 35 receives the caller identification data from Telephone Ring Signal Detector 34, detects, and then outputs the caller identification data Sc. Caller identification data Sc is then compared to the selected caller identification data from signal Dd stored in Selected Caller Data Memory Device 32 using Caller Data Comparator 38. When there is a valid comparison between the caller identification data and the selected caller identification data (a data match occurs) a valid binary compare signal Svc is generated and Alerting Device 39 is activated to emit an audible, or visual, alerting signal.

For example, when the last four digits of a caller's response, as previously described, match the last four digits of the selected caller identification data, a valid comparison occurs. The audible, or visual, alerting signal serves to alert the user of Telephone Caller Screening Device 13, that a caller identified by Selected Caller Data Memory Device 32 is calling. The user may now answer the telephone call by picking up the telephone handset of Telephone Device 14.

When there is no valid comparison to the received caller identification data (no data match) or no caller identification data was received, Telephone Ring Signal Detector 34 and Caller Data Comparator 38 are both reset to a zero level. Thus, signal Svc is not generated, and Alerting Device 39 is not activated.

Figure 2:
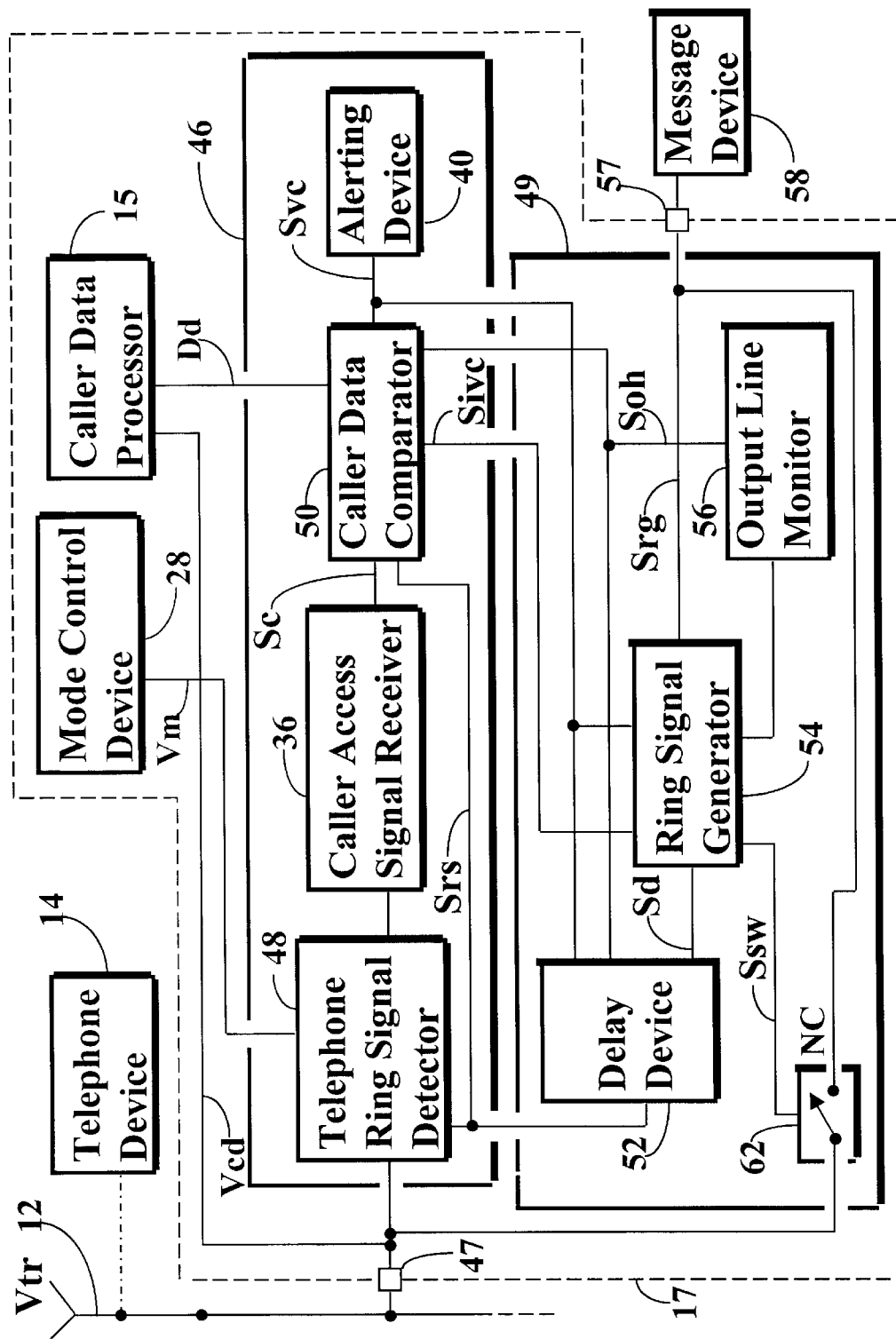
FIG. 2 illustrates a block diagram of another embodiment of a Telephone Caller Screening Device for describing the operation in the Privacy mode, with the addition of a telephone message device capable of receiving and transmitting messages.

FIG. 2 illustrates an embodiment of Telephone Caller Screening Device 17 for describing the operation in the Privacy mode with Telephone Device 14 and Message Device 58.

In the embodiment of FIG. 2, telephone line 12 is connected (or is connectable) to Telephone Device 14 (and other possible telephone devices, not shown). Telephone line 12 is further connected to Telephone Ring Signal Detector 48, to Caller Data Processor 15, and to Switch 62, all via port 47. Caller Data Processor 15 operates as described in FIG. 1. Note Telephone Device 14 alternatively can always be connected to telephone line 12, and its telephone ringer normally activated by incoming ring signals. Mode Control Device 28 is coupled to Telephone Ring Signal Detector 48 and provides the mode control signal Vm (as described in FIG. 1). Caller Access Signal Receiver 36 is connected to Telephone Ring Signal Detector 48. Caller Data Comparator 50 is connected to Caller Access Signal Receiver 36, and to signal Dd from Selected Caller Data Memory Device 32 (FIG. 1) of Caller Data Processor 15.

Output Line Monitor 56, outputs a hook-status binary output signal Soh, and is coupled to Delay Device 52, and to Caller Data Comparator 50. Comparator 50 has a valid output, having the valid compare signal Svc, and an invalid output, having an invalid binary compare signal Sivc. The valid output of Caller Data Comparator 50 is connected to Alerting Device 40, to Ring Signal Generator 54, and to Delay Device 52. Telephone Ring Signal Detector 48, outputs a binary reset signal Srs, and is connected to Delay Device 52, and to Caller Data Comparator 50. An output of Delay Device 52, having binary time delay signal Sd, is connected to Ring Signal Generator 54. Generator 54 has an output for providing a simulated ring signal Srg after Ring Signal Generator 54 is activated. The invalid output of Caller Data Comparator 50 is connected to Ring Signal Generator 54. Ring Signal Generator 54 is also connected to Output Line Monitor 56.

Normally closed (NC) Switch 62 connects in series between telephone line 12 and the ring signal output of Ring Signal Generator 54 and to port 57. Switch 62 is coupled to the switch output of Ring Signal Generator 54, and is controlled by switch signal Ssw from Ring Signal Generator 54. Message Device 58, via port 57, is connected to the ring signal output of Ring Signal Generator 54, and coupled to telephone line 12 via port 47 and Switch 62. The circuitry of block 46 comprises caller screening processor 46, which is coupled to the circuitry of block 49 comprising Output Response Device 49. Thus port 57 is coupled to Output Response Device 49 and to port 47 and is connectable to Message Device 58.

Looking at FIG. 2, when mode control signal Vm is at a zero level, Telephone Ring Signal Detector 48 is not active, and Telephone Caller Screening Device 17 is in the Caller Data Collection Mode. As a result, delay signal Sd, invalid compare signal Sivc, and valid compare signal Svc are all at a zero level. Thus, switch signal Ssw of Ring Signal Generator 54 is at a zero level, and Switch 62 remains closed. Switch signal Ssw is activated to a one level when either signal Svc, Sivc or Sd is activated to a one level. Thus in the Caller Data Collection Mode, when an incoming telephone call occurs on telephone line 12, its ring signals cause Telephone Device 14 to audibly ring. When unanswered, the call will be received by Message Device 58 after a predetermined number of ring signal bursts on telephone line 12. A ring signal burst is a series of electrical ring signal cycles. In this mode, Telephone Device 14 and Message Device 58 operate normally without intervention from any of the other devices in Telephone Caller Screening Device 17.

Again, looking at FIG. 2, when mode control signal Vm is set to a one level, Telephone Ring Signal Detector 48 is activated to receive an incoming ring signal, and Telephone Caller Screening Device 17 is in the Privacy Mode. However, prior to signals Sd, or Sivc, or Svc transitioning to a one level, Switch 62 is normally closed, and Message Device 58 is normally connected to telephone line 12 as previously described.

When an incoming telephone call occurs on telephone line 12, an off-hook condition is placed on telephone line 12, by Telephone Ring Signal Detector 48 prior to the first incoming ring signal quarter-cycle, suppressing the ring signal and causing termination of the incoming ring signal. Thus, Telephone Device 14 (or any other telephone device connected to telephone line 12) does not emit audible alerting signals, and ring signals from the incoming telephone call will not activate Message Device 58. After Telephone Ring Signal Detector 48 has placed an off-hook condition on telephone line 12, Telephone Ring Signal Detector 48 transmits a signal via telephone line 12 indicating that caller identification data be provided by the caller. Telephone Ring Signal Detector 48 also activates Delay Device 52 for outputting delay signal Sd after a pre-determined time interval Td from when an off-hook condition occurs on telephone line 12.

In the following paragraphs, five different sequences of operation of the embodiment of FIG. 2, depending on telephone caller response, are described using the waveform sequences of FIGS. 3 through 7.

Figure 3:
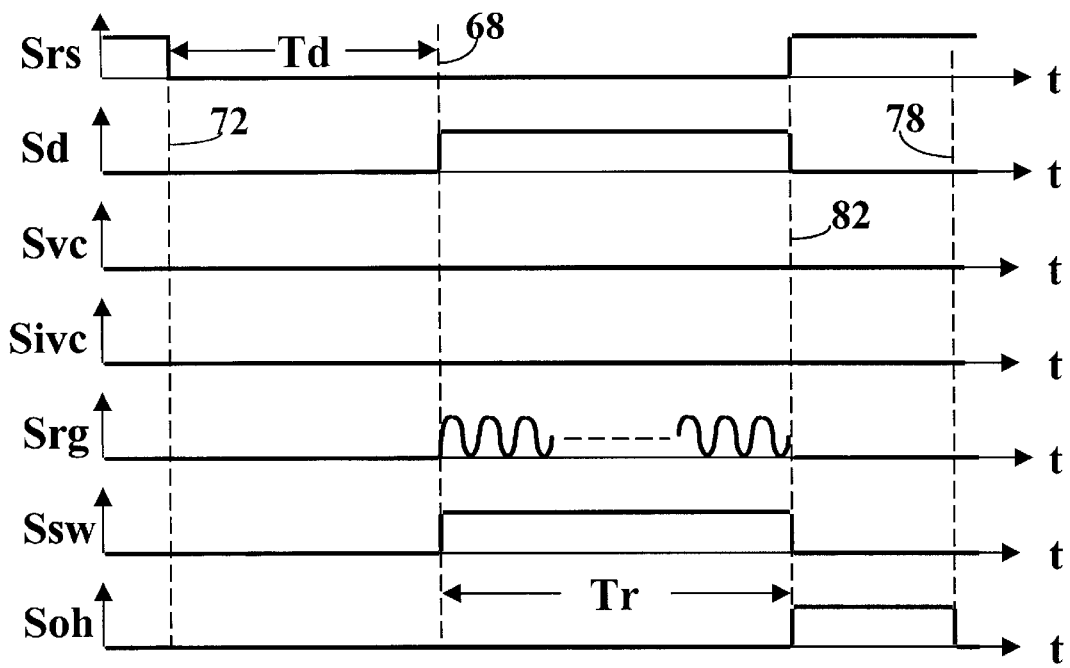
FIG. 3 illustrates the sequence of waveforms in the operation of the block diagram of FIG. 2, when no telephone caller response occurs, following a request for telephone caller identification data.

Looking at FIG. 3, the sequence of various waveforms in the operation of the block diagram of FIG. 2, when no telephone caller response occurs, following a request for telephone caller identification data is shown.

When Telephone Ring Signal Detector 48 generates the off-hook condition on telephone line 12 in response to the ring signals of the incoming telephone call at time 72, reset signal Srs is also generated as shown. Delay Device 52 is also activated at time 72. At the end of the pre-determined time interval Td at time 68, when no response was received from the telephone caller, delay signal Sd transitions from a zero level to a one level. As a result, Ring Signal Generator 54 is activated by signal Sd transitioning to a one level, causing switch signal Ssw to a one level, which opens Switch 62 at time 68. Since Switch 62 is opened, simulated ring signal Srg, from Ring Signal Generator 54, is isolated from telephone line 12 but is applied to Message device 58. Without a caller response, signals Svc and Sivc stay at a zero level. Alerting Device 40 is not activated, and thus, remains silent.

After a pre-determined number of ring signal (Srg) bursts, over time interval Tr, from Ring Signal Generator 54, Message Device 58 activates to an off-hook condition at time 82. When Message Device 58 goes to the off-hook condition, Output Line Monitor 56 detects the off-hook condition by monitoring the output of Ring Signal Generator 54. Methods to detect an off-hook condition in the presence of a ring signal are well known. For example, U.S. Pat. Nos. 4,447,675 and 5,335,271 provide different approaches as "ring-trip" detectors.

Upon detecting the off-hook condition caused by Message Device 58, Output Line Monitor 56 generates signal Soh at a one level at time 82 to reset Caller Data Comparator 50 and Delay Device 52. As a result, signal Sd is reset to a zero level, signal Ssw, from Ring Signal Generator 54 transitions to a zero level at time 82. FIG. 2 shows a specific manner in which signal Soh causes Ring Signal Generator 54 to terminate signal Srg and close switch 62. However, those skilled in the art can utilize other methods to terminate signal Srg and cause Switch 62 to close in response to signal Soh.

Thus, Switch 62 closes and Message Device 58 is now reconnected to telephone line 12. Message Device 58 then provides a greeting message and records the telephone caller's message in a normal manner. Telephone Ring Signal Detector 48 next detects two off-hook conditions on telephone line 12 (one due to Telephone Ring Signal Detector 48 and one due to Message Device 58), and generates signal Srs at time 82 to reset Caller Data Comparator 50 and Delay Device 52. The presence of the two off-hook conditions on telephone line 12 also causes Telephone Ring Signal Detector 48 to disconnect itself from telephone line 12, causing Telephone Caller Screening Device 17 to reset, to await the next incoming telephone call. Methods to detect a two off-hook condition on telephone line 12 are well known. For example, U.S. patents include U.S. Pat. Nos. 5,394,465 and 5,422,939, which provide different approaches as two off-hook detectors.

Eventually, Message Device 58 provides an on-hook condition at port 57, causing signal Soh to transition to a zero level at time 78, after having completed its messaging function. An on-hook condition is equivalent to "hanging up" a telephone, by returning the telephone handset to its cradle position. Thus, the waveforms of FIG. 3 describe the sequence of events when the telephone caller did not attempt to respond with caller identification data.

By now it can be appreciated that without any response from the telephone caller, Alerting Device 40 is not activated, and the users of Telephone Caller Screening Device 17 are not disturbed by any audible alerting signals from an incoming telephone call by a non-responding caller.

Figure 4:
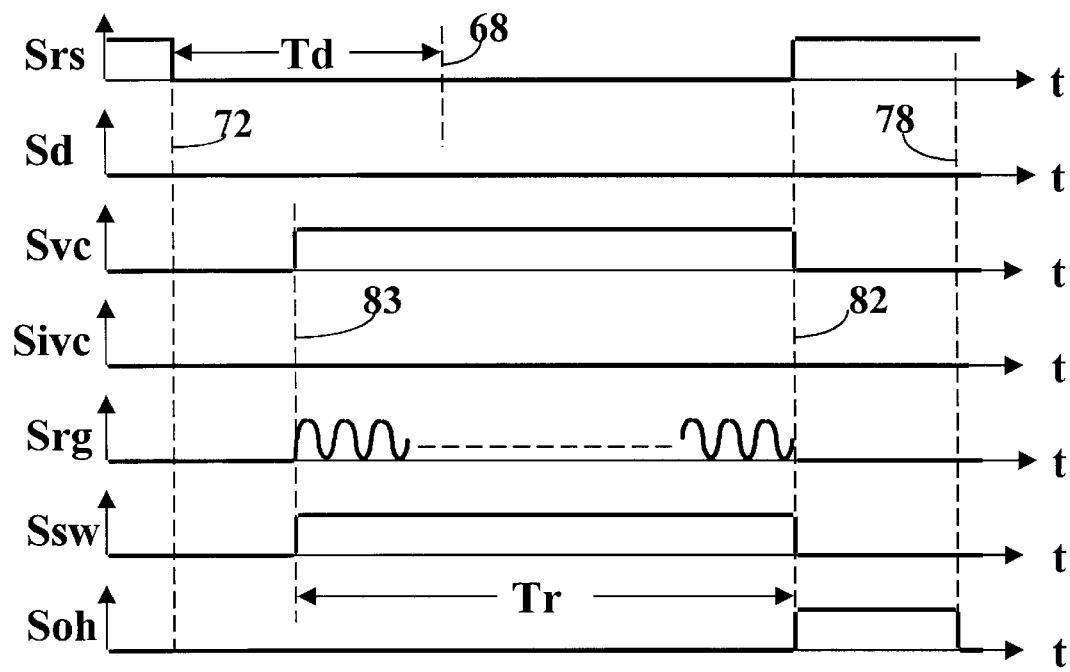
FIG. 4 illustrates the sequence of waveforms in the operation of the block diagram of FIG. 2, when a valid telephone caller response occurs, following a request for telephone caller identification data.

FIG. 4 illustrates the function of the Telephone Caller Screening Device 17 (of FIG. 2) when the telephone caller responds with valid caller identification data prior to the expiration of the delay interval Td at time 68, generated by Delay Device 52.

For this case, caller identification data Sc is transmitted to Caller Data Comparator 50 via Telephone Ring Signal Detector 48 and Caller Access Signal Receiver 36 at time 83. The caller identification data Sc is compared with the data stored in Selected Caller Data Memory Device 32 (FIG. 1) via selected caller identification data signal Dd. Signal Svc is generated when caller identification data Sc compares with selected caller identification data on signal Dd. For this case, signal Svc resets Delay Device 52 at time 83, and activates Alerting Device 40 and Ring Signal Generator 54. As a result of signal Svc, Ring Signal Generator 54 outputs signal Srg and causes signal Ssw to output to a one level, opening Switch 62 to prevent signal Srg from being outputted on telephone line 12.

When a pre-determined number of ring signal bursts occur over time interval Tr from Ring Signal Generator 54, and the telephone handset of Telephone Device 14 has not been picked up, Message Device 58 is activated and goes off-hook at port 57 at time 82. Message Device 58 going off-hook is detected by Output Line Monitor 56, by monitoring the output of Ring Signal Generator 54. Upon detecting the off-hook condition of Message Device 58, Output Line Monitor 56 generates signal Soh at a one level, at time 82, which resets Caller Data Comparator 50 and causes Delay Device 52 to output to a zero level. As a result of signal Svc returning to a zero level, ring signal Srg is terminated and signal Ssw of Ring Signal Generator 54 transitions to a zero level at time 82, causing Switch 62 to close. Message Device 58 is reconnected to telephone line 12 at time 82. As a result, the telephone caller is asked to leave a message by Message Device 58, which operates in a manner known in the art.

The off-hook condition of Message Device 58 and the off-hook condition generated earlier by Telephone Ring Signal Detector 48 are now on telephone line 12. Upon detecting these two off-hook conditions, Telephone Ring Signal Detector 48 generates signal Srs at time 82 to reset Caller Data Comparator 50 and Delay Device 52. The presence of the two off-hook conditions on telephone line 12 terminates ring signal Srg and also causes Telephone Ring Signal Detector 48 to disconnect itself from telephone line 12, causing Telephone Caller Screening Device 17 to reset, awaiting the next incoming telephone call. Eventually, Message Device 58 will provide an on-hook condition at port 57, causing signal Soh to transition to a zero level at time 78, after having completed its messaging function. Thus, the waveforms of FIG. 4 describes the sequence of events when a valid caller identification data occurs.

When the user picks up the handset of Telephone Device 14 before Message Device 58 goes off-hook, a second off-hook condition occurs on telephone line 12, i.e., Telephone Device 14 in addition to the off-hook condition placed on telephone line 12 by Telephone Ring Signal Detector 48. Telephone Ring Signal Detector 48 then detects the two off-hook condition, terminating signal Srg and disconnecting itself from telephone line 12, and generating signal Srs. Signal Srs will then reset Caller Data Comparator 50 and Delay Device 52, causing Telephone Caller Screening Device 17 to reset, awaiting the next incoming telephone call.

Figure 5:
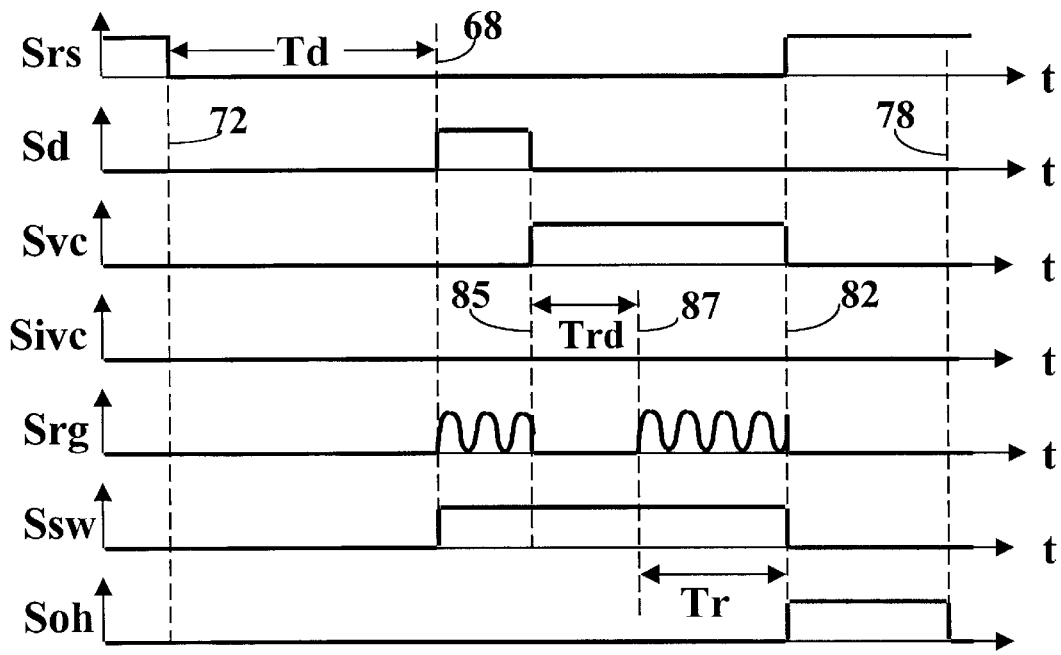
FIG. 5 illustrates the sequence of waveforms in the operation of the block diagram of FIG. 2, when a valid telephone caller response occurs after the expiration of a delay time interval, following a request for telephone caller identification data.

Referring to FIG. 5, the sequence of various waveforms in the operation of the block diagram of FIG. 2 is shown when a valid telephone caller response occurs after the expiration of a delay time interval, following a request for telephone caller identification data.

When the telephone caller is slow in responding, such that the caller identification data is entered after the delay time Td has expired, signal Sd transitions to a one level at time 68. Signal Sd activates Ring Signal Generator 54, providing signal Srg, and causing signal Ssw to open Switch 62 as previously described. However, when the caller identification data is received by Telephone Ring Signal Detector 48 after delay interval Td, the signal is transmitted through Caller Access Signal Receiver 36, which outputs caller identification data Sc to Caller Data Comparator 50.

When caller identification signal Sc is valid, a valid comparison is made with data from signal Dd, and signal Svc transitions to a one level at time 85. Signal Svc resets Delay Device 52 and Ring Signal Generator 54. However, due to signal Svc being at a one level, Ring Signal Generator 54 continues to output signal Ssw at a one level, causing Switch 62 to remain open. Signal Svc initially deactivates Ring Signal Generator 54 at time 85 as shown.

Ring Signal Generator 54 reactivates after a ring signal delay time interval Trd at time 87. Time interval Trd resets the ring signal burst count of Message Device 58. Ring Signal Generator 54 provides the delay time interval Trd after signal Svc, when signal Sivc occurs prior to signal Svc.

When the handset of Telephone Device 14 remains on-hook, Message Device 58 is activated at time 82 and goes off-hook at port 57, after ring signal (Srg) bursts occur for time interval Tr from Ring Signal Generator 54. When Message Device 58 goes to an off-hook condition at port 57, Output Line Monitor 56 detects the off-hook condition, and sets signal Soh to a one level at time 82. This resets Caller Data Comparator 50 and Delay Device 52. As a result of resetting signal Svc, Ring Signal Generator 54 terminates ring signal Srg and outputs signal Ssw at a zero level, causing Switch 62 to close, reconnecting Message Device 58 to telephone line 12. This permits Message Device 58 to operate in a normal messaging function.

The off-hook condition of Message Device 58 at port 57, and the off-hook condition generated earlier by Telephone Ring Signal Detector 48 at port 47, cause a two off-hook condition on telephone line 12. Upon detecting these two off-hook conditions, Telephone Ring Signal Detector 48 generates signal Srs at time 82 resetting Caller Data Comparator 50 and Delay Device 52. The presence of the two off-hook conditions on telephone line 12 terminates signal Srg and also causes Telephone Ring Signal Detector 48 to disconnect itself from telephone line 12, causing Telephone Caller Screening Device 17 to reset, and await the next incoming telephone call. Message Device 58 goes on-hook after completing its messaging function, causing signal Soh to transition to a zero level at time 78.

Thus, it can be appreciated that the waveforms of FIG. 5 describe the events when the valid caller identification data is received after time interval Td for Telephone Caller Screening Device 17.

When the user picks up the handset of Telephone Device 14 prior to Message Device 58 going off-hook at port 57, a second off-hook condition on telephone line 12 occurs in addition to the off-hook condition placed on telephone line 12 by Telephone Ring Signal Detector 48 at port 47. Telephone Ring Signal Detector 48 detects the two off-hook condition and disconnects itself from telephone line 12 and generates signal Srs. Signal Srs then resets the output signals of Caller Data Comparator 50 and Delay Device 52 to a zero level, causing termination of signal Srg and further causing Telephone Caller Screening Device 17 to reset, to await the next incoming telephone call.

Figure 6:
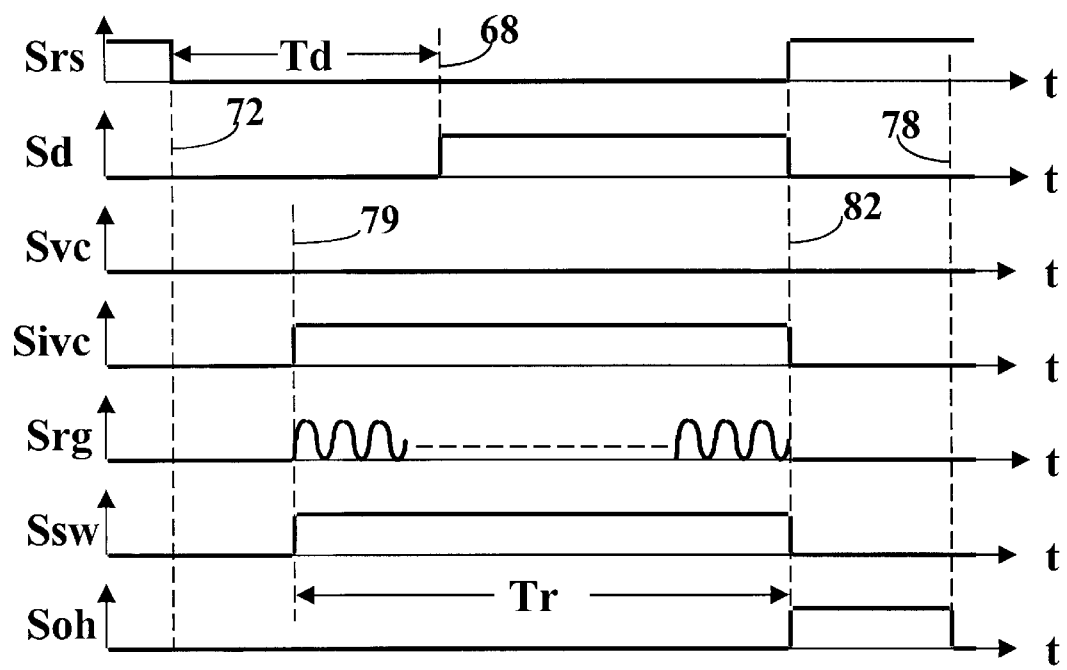
FIG. 6 illustrates the sequence of waveforms in the operation of the block diagram of FIG. 2, when an invalid telephone caller response occurs, following a request for telephone caller identification data.

FIG. 6 describes the sequence of events that occur when the telephone caller enters an invalid caller identification data following a request for telephone caller identification data and prior to time interval Td. When the telephone caller responds with a caller identification data prior to the expiration of delay interval Td generated by Delay Device 52, caller identification data Sc is transmitted to Caller Data Comparator 50 from Telephone Ring Signal Detector 48 via Caller Access Signal Receiver 36. Caller identification data Sc is compared with the signal Dd from Selected Caller Data Memory Device 32 (FIG. 1). Invalid signal Sivc is generated at time 79 by Caller Data Comparator 50, when caller identification data Sc unsuccessfully compares with data on signal Dd.

For this case, Alerting Device 40 is not activated, and thus remains silent. Also, signal Sivc causes Ring Signal Generator 54 to output signal Ssw to a one level opening Switch 62 at time 79. Signal Sivc also activates Ring Signal Generator 54 to output signals Srg at time 79. After a pre-determined number of ring signal (Srg) bursts during time interval Tr from Ring Signal Generator 54, Message Device 58 activates and goes off-hook at time 82. When Message Device 58 goes off hook at port 57, the Output Line Monitor 56 detects the off-hook condition by monitoring the output of Ring Signal Generator 54. Output Line Monitor 56 then generates signal Soh at a one level at time 82 resetting Caller Data Comparator 50 and Delay Device 52. As a result of signal Sivc becoming a zero level, ring signal Srg is terminated and output signal Ssw, from Ring Signal Generator 54, goes to a zero level at time 82, and Switch 62 closes, causing Message Device 58 to reconnected to telephone line 12. This action permits Message Device 58 to operate in a normal manner.

The off-hook condition of Message Device 58 at port 57, and the off-hook condition generated earlier by Telephone Ring Signal Detector 48 at port 47, are now both on telephone line 12. Upon detecting these two off-hook conditions, Telephone Ring Signal Detector 48 generates signal Srs at time 82 to reset Caller Data Comparator 50 and Delay Device 52. The presence of the two off-hook conditions on telephone line 12 terminates signal Srg and causes Telephone Ring Signal Detector 48 to disconnect itself from telephone line 12, resetting Telephone Caller Screening Device 17 to await the next incoming telephone call. Eventually, Message Device 58 will go on-hook at port 57, after having completed its messaging function, causing signal Soh to a zero level at time 78. Thus, the waveforms of FIG. 6 describes the sequence of events when the telephone caller entered an invalid caller identification data, prior to time interval Td.

Figure 7:
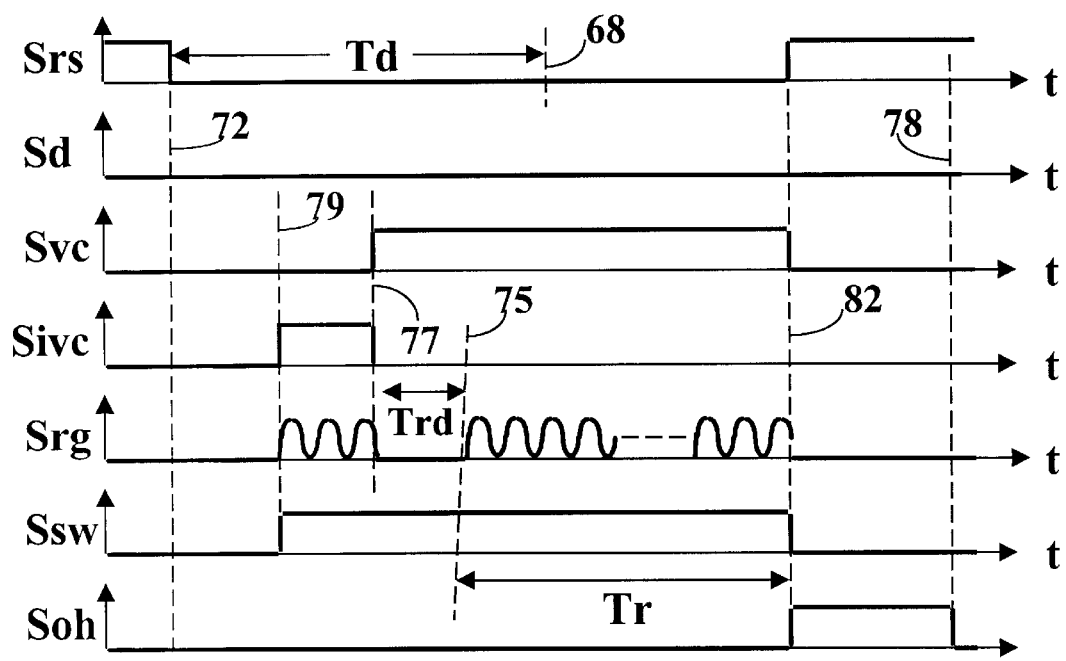
FIG. 7 illustrates the sequence of waveforms in the operation of block diagram of FIG. 2, when a valid telephone caller response occurs after an invalid telephone caller response has occurred, following a request for caller identification data.

FIG. 7 describes the sequence of events, in reference to Telephone Caller Screening Device 17 of FIG. 2, when a telephone caller first enters an invalid caller identification data, and then enters a valid caller identification data.

When the telephone caller responds with a caller identification data prior to the expiration of the delay interval Td generated by Delay Device 52, caller identification data Sc is transmitted to Caller Data Comparator 50 from Telephone Ring Signal Detector 48 via Caller Access Signal Receiver 36.

Caller identification data Sc is compared with the signal Dd from data stored in Selected Caller Data Memory Device 32 (FIG. 1). Invalid signal Sivc is generated at time 79 by Caller Data Comparator 50, when the caller identification data Sc unsuccessfully compares with data on signal Dd. As a result, Alerting Device 40 is not activated and remains silent. Also, signal Sivc causes Ring Signal Generator 54 to output signal Ssw to a one level which opens Switch 62. Signal Sivc also activates Ring Signal Generator 54, generating ring signal bursts of signal Srg at time 79. Subsequently, when the telephone caller responds with another caller identification data Sc providing a valid comparison, signal Svc is generated at a one level at time 77, and signal Sivc goes to a zero level at time 77. Signal Svc activates Alerting Device 40 which emits an audible alert signal, resets Delay Device 52 and resets Ring Signal Generator 54, thereby terminating signal Srg at time 77. Signal Svc being at a one level also causes Ring Signal Generator 54 to maintain signal Ssw at a one level, holding Switch 62 in an open position. After time interval Trd, the Ring Signal Generator 54 is re-activated at time 75. After a predetermined number of ring signal bursts during time interval Tr from the Ring Signal Generator 54, Message Device 58 is activated and goes off-hook at port 57 at time 82.

When Message Device 58 goes off-hook, Output Line Monitor 56 detects the off-hook condition by monitoring the output of Ring Signal Generator 54. Upon detecting the off-hook condition of Message Device 58, Output Line Monitor 56 generates signal Soh at a one level at time 82 resetting Caller Data Comparator 50 and Delay Device 52. Since signal Svc is returned to a zero level, ring signal Srg is terminated, and the output signal Ssw of Ring Signal Generator 54 goes to a zero level, and Switch 62 becomes closed, reconnecting Message Device 58 to telephone line 12. This allows Message Device 58 to operate in a normal manner.

The off-hook condition of Message Device 58 at port 57, and the off-hook condition generated earlier by Telephone Ring Signal Detector 48 at port 47 are now both on telephone line 12. Upon detecting the two off-hook conditions, Telephone Ring Signal Detector generates signal Srs at time 82 to reset Caller Data Comparator 50 and Delay Device 52. The presence of the two off-hook conditions on telephone line 12 also causes Telephone Ring Signal Detector 12 to terminate signal Srg and to disconnect itself from telephone line 12, causing Telephone Caller Screening Device 17 to reset, awaiting the next incoming telephone call.

Eventually, Message Device 58 will go on-hook at port 57 after having completed its messaging function, causing signal Soh to a zero level at time 78. Thus the waveforms of FIG. 7 describes the sequence of events when the telephone caller first enters an invalid caller identification data and then follows by entering a valid caller identification data.

When the user picks up the handset of Telephone Device 14, prior to the activation of the Message Device 58, a second off-hook condition occurs on telephone line 12 due to Telephone Device 14, in addition to the off-hook condition placed on telephone line 12 by Telephone Ring Signal Detector 48 at port 47. This action causes Telephone Ring Signal Detector 48 to detect the two off-hook condition and to disconnect itself from telephone line 12 and to generate signal Srs at time 82. Signal Srs then resets Caller Data Comparator 50 and Delay Device 52, causing Telephone Caller Screening Device 17 to terminate signal Srg and reset, to await the next incoming telephone call.

Figure 8:
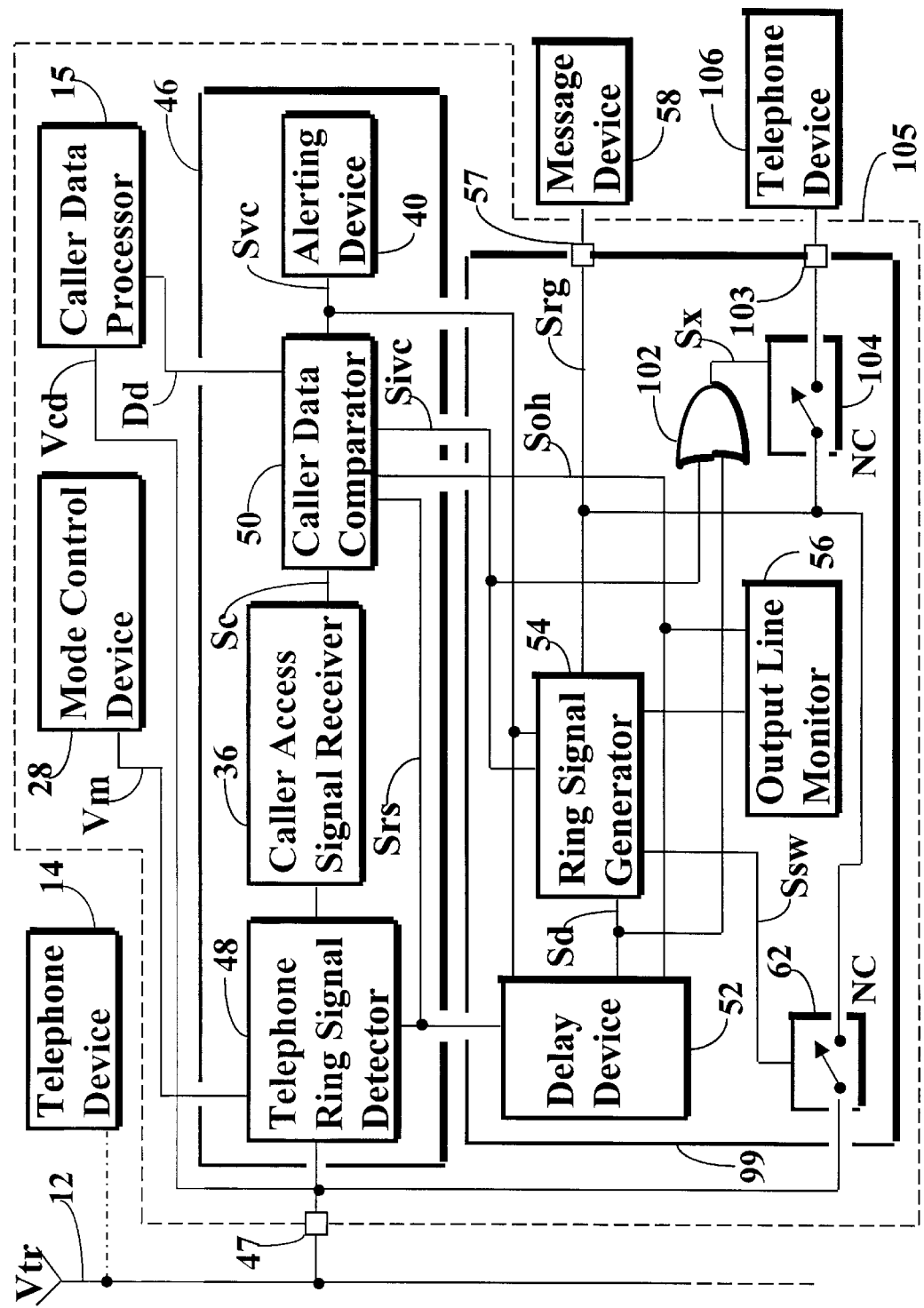
FIG. 8 illustrates a block diagram of a further embodiment of a Telephone Caller Screening Device, when operating in the Privacy mode with the addition of a telephone device capable of generating audible alerting signals.

FIG. 8 contains a further embodiment of the circuit of FIG. 2. FIG. 8 illustrates a block diagram of Telephone Caller Screening Device 105, operating in the Privacy mode with the addition of Telephone Device 106 that is capable of generating audible alerting signals.

Referring to FIG. 8, Telephone Device 14, Mode Control Device 28, Caller Data Processor 15, Caller Screening Processor 46, Delay Device 52, Ring Signal Generator 54, Output Line Monitor 56, Switch 62, and Message Device 58 are connected and operate substantially as represented in the description of FIG. 2. Additionally, Delay Device 52, Ring Signal Generator 54, Output Line Monitor 56, Switch 62, OR gate 102, and normally closed (NC) Switch 104 comprise Output Response Device 99.

First and second inputs of OR gate 102 are connected to receive signals Sivc and Sd, respectively. The output of OR gate 102 is connected to the control input of Switch 104. One side of Switch 104 is connected to Switch 62, Ring Signal Generator 54, and to port 57 of Output Response Device 99. The second side of Switch 104 is connected to port 103 of Output Response Device 99.

Furthermore, Message Device 58 is connected to port 57. An additional Telephone Device 106 (which alternatively includes a remote cordless telephone device) is connected or is connectable to Output Response Device 99 by port 103.

In operation, a zero level of switch signal Sx at the output of OR gate 102 causes Switch 104 to remain closed, and a one level of signal Sx causes Switch 104 to open. When the telephone caller does not respond with caller identification data, or responds with invalid caller identification data, signal Sd or signal Sivc becomes a one level, respectively, causing Switch 104 to open. As a result, Telephone Device 106 is not connected to Ring Signal Generator 54 and Message Device 58, and will not emit an audible alerting signal when Ring Signal Generator 54 is outputting signal Srg.

When the telephone caller responds with valid caller identification data, signals Sd and Sivc are at a zero level, causing OR gate 102 to output signal Sx to a zero level, and further causing Switch 104 to remain closed. As a result, Telephone Device 106 is connected to Ring Signal Generator 54, and to Message Device 58. Thus, Telephone Device 106 emits audible alerting signals, while Message Device 58 is also receiving signal Srg from Ring Signal Generator 54. Otherwise, the operation of the Telephone Screening Device of FIG. 8 is, substantially, the same as the operation of the embodiment of the Telephone Screening Device of FIG. 2.

For example, in the Privacy Mode, telephone devices 14 and 106 are both connected to telephone line 12. During an incoming telephone ring signal on telephone line 12, the telephone devices do not emit audible alerting signals, since Telephone Ring Signal Detector 48 goes off-hook prior to the first quarter-cycle of the first incoming ring signal. Also, when Telephone Device 106 goes off-hook, Telephone Ring Signal Detector 48 detects the two off-hook conditions and terminates signal Srg and disconnects itself from telephone line 12, causing the Telephone Caller Screening Device to reset, to await the next incoming telephone call.

It can now be appreciated that the Telephone Screening Device of the present invention provides for collecting incoming Caller ID data on telephone line 12 in the Data Collection Mode, and selectively storing the desired collected Caller ID data for use in telephone call screening in the Privacy Mode.

It can be further appreciated that it is not necessary to manually and tediously enter the desired selected caller screening data.

It can be even further appreciated that, in the Privacy mode, the present invention utilizes the suppression of incoming ring signals on the telephone line 12 using the Telephone Ring Signal Detector 48, by generating an off-hook condition on the telephone line 12 prior to the first quarter-cycle of the first incoming ring signal. As a result, all telephone devices and message devices remain silent or inactive even while connected to the telephone line 12 during the first incoming ring signal.

It can be more appreciated that after Telephone Ring Signal Detector 48 has generated the off-hook condition on telephone line 12, a valid caller identification data will cause activation of alerting signals by Alerting Device 40 and Telephone Device 106, while simulated ring signals are sent to Message Device 58. An invalid caller identification data will not produce any alerting signals, and, eventually, Message Device 58 will be activated, and operate in the normal manner to record a message from the telephone caller. During activation of Message Device 58, the Telephone Ring Signal Detector 48 detects a two off-hook condition on line 12 and returns to an on-hook condition and resets the Telephone Caller Screening Device. When telephone device 14 or 106 go off-hook in response to an alerting signal, the Telephone Ring Signal Detector 48 detects a two off-hook condition on line 12 and disconnects itself form telephone line 12 and resets the Telephone Caller Screening Device.

It can be even more appreciated that in either the Data Collection mode, or the Privacy mode, incoming telephone calls, or outgoing telephone calls, can be received, or made, on any telephone device at the user's premise, such as Telephone Devices 14 or 106, without the need to activate any switching devices between these telephones and the telephone line.

It can also be appreciated that in the Privacy Mode, only callers who are known to the user will activate alerting signals. The user is not disturbed by, and a user's privacy is guarded from, unknown callers.

It can be further appreciated that in the present invention during the Privacy Mode, the telephone caller may initiate a telephone call from any telephone (including a cellular telephone) at any location, provided the caller uses the previously selected caller identification data. Thus, in the Privacy mode, the caller is not dependent on the caller ID of the telephone from which the call was made, and therefore, the caller may call from any telephone location and activate the alerting signals as a valid caller.

While specific embodiments of the present invention have been shown and described, further modifications and improvements will occur to those skilled in the art. It is understood that the invention is not limited to the particular forms shown, and it is intended for the appended claims to cover all modifications that do not depart from the spirit and the scope of this invention.

I claim:

1. A telephone caller screening device connectable to a telephone line operable with a telephone device for receiving an incoming telephone call, comprising:

a first port connectable to said telephone line, in parallel with said telephone device;

a caller identification device coupled to said first port for receiving and storing a caller identification from said incoming telephone call on said telephone line;

a caller data selection device coupled to said caller identification device for selecting a caller identification from said caller identification device;

a selected caller data memory device coupled to said caller data selection device for storing a selected caller identification data;

a display coupled to said caller identification device for display of said caller identification from said caller identification device; and a caller screening processor coupled to said first port and to said selected caller data memory device, and capable of receiving said incoming telephone call by generating an off-hook condition on said telephone line prior to a first quarter-cycle of a first incoming ring signal from said incoming telephone call; whereby said telephone device is unresponsive to said first incoming ring signal; and a mode control device coupled to said caller screening processor to control a capability of said caller screening processor.

2. The telephone caller screening device as in claim 1, further comprising:

an output response device coupled to said caller screening processor; and a second port coupled to said output response device and to said first port, and connectable to a second telephone device.

3. The telephone caller screening device as in claim 1, further comprising:

a display control device coupled to said caller identification device, to said selected caller data memory device and to said display; whereby said caller identification from said caller identification device and said selected caller identification data from said selected caller data memory device both may be displayed by said display.

4. The caller screening processor as in claim 1, further comprising:

a telephone ring signal detector coupled to said first port and to said mode control device;

a caller access signal receiver coupled to said telephone ring signal detector;

a caller data comparator coupled to said caller access signal receiver and to said selected caller data memory device; and an alerting device coupled to said caller data comparator.

5. The output response device as in claim 2, further comprising:
   a ring signal generator coupled to said caller screening processor, and to said second port; and
   an output line monitor coupled to said ring signal generator, and to said caller screening processor.

6. The output response device as in claim 5, further comprising:
   a third port coupled to said ring signal generator, and to said first port, and connectable to a third telephone device.

7. The output response device as in claim 5, further comprising:
   a first switch coupled to said first port, to said ring signal generator, and to said second port.

8. The output response device as in claim 6, further comprising:
   a second switch coupled to said caller screening processor, to said ring signal generator, and to said third port.

9. A method of controlling an incoming telephone call using a telephone caller screening device on a telephone line operable with a telephone device, comprising the steps of:
   setting said telephone caller screening device to a first mode;
   receiving a caller identification from said incoming telephone call;
   selecting and storing a selected caller identification data from said incoming telephone call;
   setting said caller screening device to a second mode;
   detecting an incoming ring signal from said incoming telephone call on said telephone line, and generating an off-hook condition on said telephone line before a first-quarter cycle of a first incoming ring signal from said incoming telephone call; whereby preventing said telephone device from responding to said first incoming ring signal; and
   generating an alerting signal when a caller identification data from said incoming telephone call compares with said selected caller identification data.

10. A method of controlling an incoming telephone call on a telephone line as in claim 9, further comprising the step of:
    activating a second telephone device when said incoming telephone call is not answered by said telephone device after a predetermined time interval.

11. A method of controlling an incoming telephone call on a telephone line as in claim 9, when operating in said second mode, further comprising the step of:
    activating a simulated ring signal to a second telephone device when a valid comparison occurs between said caller identification data from said incoming telephone call and said selected caller identification data.

12. A method of controlling an incoming telephone call as in claim 9, when operating in said second mode, further comprising the steps of:
    prompting a caller identification data from said incoming telephone call;
    receiving said caller identification data from said incoming telephone call;
    comparing said caller identification data with said selected caller identification data;
    generating a valid compare signal when said caller identification data compares with said selected caller identification data; and
    generating an invalid compare signal when said caller identification data does not compare with said selected caller identification data.

13. The output response device as in claim 2, further comprising:
    a ring signal generator coupled to said caller screening processor, and to said second port; and
    an output line monitor coupled to said ring signal generator.

14. A telephone caller screening device connectable to a telephone line operable with a telephone device and a caller ID device for receiving an incoming telephone call, comprising:
    a first port connectable to said telephone line, in parallel with said telephone device, and connectable to said caller ID device;
    a caller data selection device coupled to said caller ID device for selecting a caller identification from said incoming telephone call;
    a selected caller data memory device coupled to said caller data selection device for storing a selected caller identification data; and
    a caller screening processor coupled to said first port and to said selected caller data memory device, and capable of receiving said incoming telephone call by generating an off-hook condition on said telephone line prior to a first quarter-cycle of a first incoming ring signal from said incoming telephone call; whereby said telephone device is unresponsive to said first incoming ring signal; and
    a mode control device coupled to said caller screening processor to control a capability of said caller screening processor.

15. A telephone caller screening device connectable to a telephone line operable with a telephone device for receiving an incoming telephone call, comprising:
    a first port coupled to said telephone line in parallel with said telephone device;
    a caller data receiver coupled to said first port;
    a caller data memory device coupled to said caller data receiver;
    a display control device couple to said caller data memory device;
    a display coupled to said display control device;
    a caller data selection device coupled to said caller data memory device;
    a selected caller data memory device coupled to said caller data selection device and to said display control device;
    a telephone ring signal detector coupled to said first port;
    a mode control device coupled to said telephone ring signal detector;
    a caller access signal receiver coupled to said telephone ring signal detector;
    a caller data comparator coupled to said caller access signal receiver and to said selected caller data memory device;
    an alerting device coupled to said caller data comparator;
    a delay device coupled to said telephone ring signal detector and to said caller data comparator;
    a ring signal generator coupled to said delay device and to said caller data comparator;
    an output line monitor coupled to said delay device, to said ring signal generator, and to said caller data comparator;

a first switch coupled to said ring signal generator, and to said first port;

a second port coupled to said ring signal generator, and to said first switch;

an OR gate coupled to said delay device and to said caller data comparator;

a second switch coupled to said ring signal generator, to said OR gate, and to said first switch; and a third port coupled to said second switch and connectable to a third telephone device.

* * * * *